UNITED STATES PATENT OFFICE.

WILLIS E. COLLINS, OF ASHEVILLE, NORTH CAROLINA.

PROCESS OF TREATING CEREALS.

1,103,660.  Specification of Letters Patent.  Patented July 14, 1914.

No Drawing.   Application filed November 14, 1913.   Serial No. 800,933.

*To all whom it may concern:*

Be it known that I, WILLIS E. COLLINS, a citizen of the United States, residing at Asheville, in the county of Buncombe and State of North Carolina, have invented certain new and useful Improvements in the Process of Treating Cereals, of which the following is a specification.

The present invention relates to improvements in the process of treating cereals and particularly to wheat.

The primary object of the invention is the provision of an improved process for the treatment of a cereal, such as wheat, by means of which an appetizing, easily digested and nutritious food retaining only the nutritive properties of its elements is produced.

The invention consists in subjecting the cereal to the steps in my process as will be described and claimed, and while I hereinafter refer to wheat as the cereal, it will be understood that the process may be applied to the treatment of other grains or cereals where found desirable.

In preparing wheat according to my process, the grains of wheat are first passed between a pair of rolls, preferably corrugated steel, in order that the husks or bran may be scalped off the grain. The product of the rolls after scalping is then sifted to eliminate the dust or fine particles leaving coarse grains or grits, and retaining however, some of the fine particles of the bran or husks. The final step in the process is pan roasting. After having been sifted as stated, the scalped grain is placed in roasting pans, preferably open, and placed in an oven of suitable temperature. The time required for roasting, of course, depends upon the temperature of the oven, but the grits are roasted until they attain the proper and desired color. During the roasting process, the grits are continually stirred, manually or otherwise, so that a uniformity of exposure of the grains to the heat is provided. The roasting is continued until the grits are partially dextrinized and the starch granules ruptured, the degree or extent to be determined. The resultant article of the above process is a food of delicious and nutritious properties, well adapted for a breakfast food of satisfying qualities and capable of quick and easy preparation. In addition to these properties, the presence of the fine particles of bran in the product, lend to the food the powers of a laxative.

Having thus fully described my invention, what I claim is:—

The improved process of treating wheat consisting in first passing the grain between rolls to scalp the bran therefrom, sifting the product to eliminate some of the fine particles; then roasting the remainder until starch granules are ruptured, and constantly stirring until the grits are partially dextrinized.

In testimony whereof I affix my signature in presence of two witnesses.

WILLIS E. COLLINS.

Witnesses:
J. B. GRICE,
J. W. JONES.